United States Patent
Okutani et al.

(10) Patent No.: US 6,766,105 B1
(45) Date of Patent: Jul. 20, 2004

(54) DIGITAL VTR

(75) Inventors: Ayumu Okutani, Kashihara (JP); Yukio Sugimura, Suita (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/275,022

(22) Filed: Mar. 24, 1999

(30) Foreign Application Priority Data

Mar. 27, 1998 (JP) .......................................... 10/081030
Mar. 27, 1998 (JP) .......................................... 10/081031

(51) Int. Cl.[7] .............................................. H04N 7/26
(52) U.S. Cl. ...................................... 386/112; 386/124
(58) Field of Search ........................ 386/33, 69, 79–80, 386/111–112, 124; 360/72.1–72.2, 73.11–73.13

(56) References Cited

U.S. PATENT DOCUMENTS

| | | | | |
|---|---|---|---|---|
| 4,893,202 A | * | 1/1990 | Smith | 360/79 |
| 5,019,914 A | * | 5/1991 | Dropsy | 386/41 |
| 5,457,580 A | * | 10/1995 | Yoo | 360/32 |
| 5,583,936 A | * | 12/1996 | Wonfor et al. | 380/204 |
| 5,586,200 A | * | 12/1996 | Devaney et al. | 382/232 |
| 5,841,942 A | * | 11/1998 | Sugiyama | 386/109 |

FOREIGN PATENT DOCUMENTS

| | | |
|---|---|---|
| JP | 49-128713 | 12/1974 |
| JP | 3-127364 | 5/1991 |

OTHER PUBLICATIONS

Copy of Japanese Patent Office Notice of Rejection for corresponding Japanese Patent Application No. 10–081030 dated Jul. 13, 1999.

* cited by examiner

*Primary Examiner*—Thai Tran
*Assistant Examiner*—Polin Chieu
(74) *Attorney, Agent, or Firm*—Armstrong, Kratz, Quintos, Hanson & Brooks, LLP

(57) ABSTRACT

A digital VTR according to the present invention comprises an image compressing circuit for subjecting input image data to variable length compression, to output variable length coding data and identification data representing the end of one field, recording means for recording on a video tape the variable length coding data outputted from the image compressing circuit, and pseudo CTL signal recording means for recording a pseudo CTL signal on the video tape every time the identification data is outputted from the image compressing circuit.

6 Claims, 4 Drawing Sheets

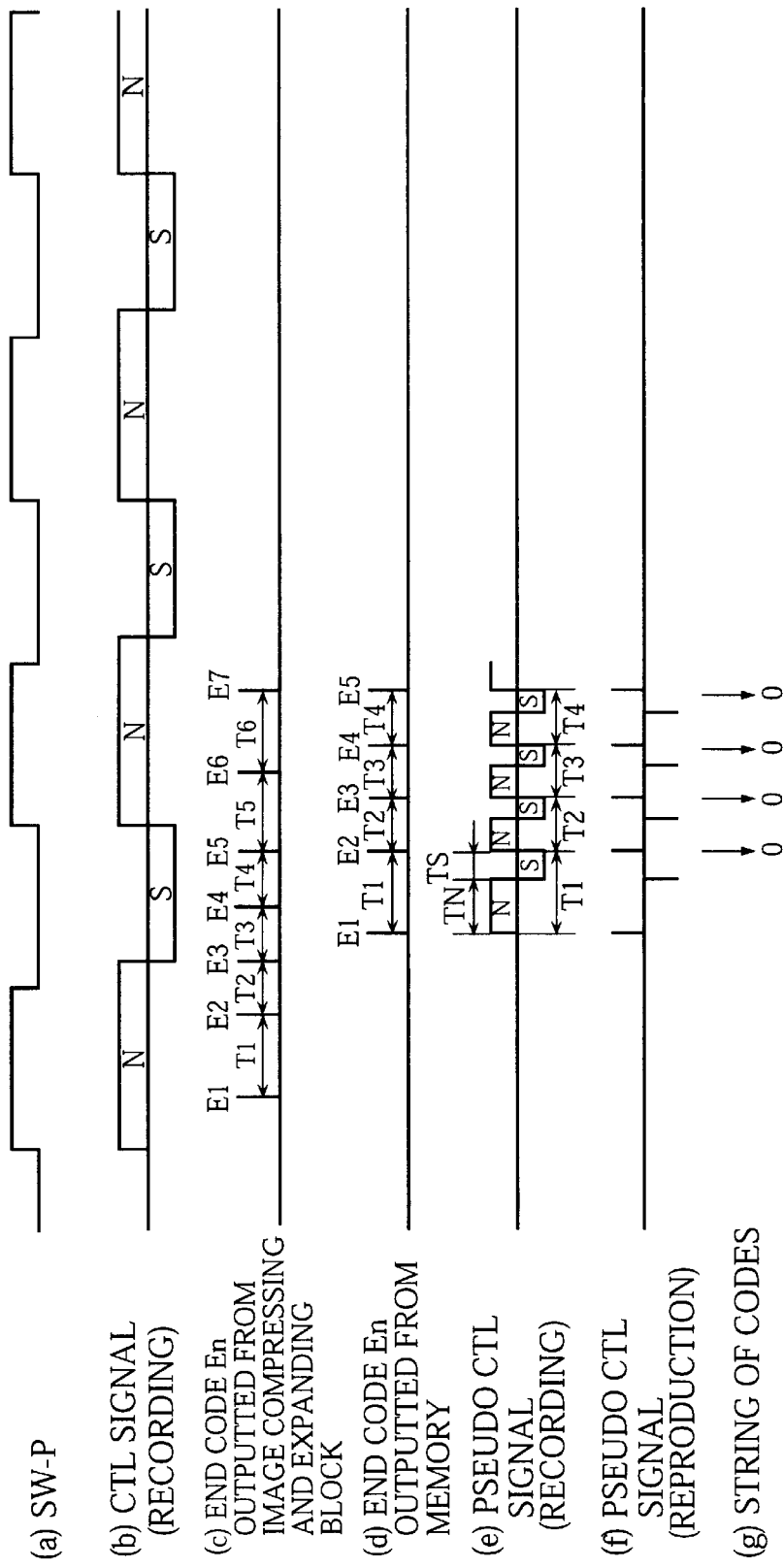

DIGITAL VTR

BACKGROUND OF THE INVENTION

1. Field of the Invention

The present invention relates to a digital VTR for subjecting input image data to variable length compression to record variable length coding data on a video tape so that the number of fields and the number of tracks composing the recorded variable length coding data are not in a linear relationship.

2. Description of the Related Art

In a digital VTR (Video Tape Recorder) comprising a conventional image compressing circuit, input image data is subjected to fixed length compression, and coding data obtained is recorded on a video tape, so that the number of fields and the number of tracks composing the recorded coding data are in a linear relationship. In such a digital VTR, the tape running distance obtained from CTL (control) pulses and the number of fields composing an image read out of the video tape are in a linear relationship, thereby making it possible to realize a linear time counter function in which absolute time information or the like is obtained by counting the CTL pulses.

In such a digital VTR, the type running distance obtained from the CTL pulses and the number of fields composing the image read out of the video tape are in a linear relationship, thereby making it possible to record on the video tape a control signal such as a VISS (VHS Index Search System) signal which is a signal for searching for an arbitrary scene or a VASS (VHS Address Search System) signal for recording time required for recording or the like utilizing a CTL signal, as in a conventional analog VTR.

Writing of one CTL signal is performed by first writing the N pole and then writing the S pole after an elapse of a predetermined time period. "0" or "1" can be indicated by the ratio of time required to write the N pole to time required to write the S pole within one period of the CTL signal. The VISS signal is a signal which is a succession of 60 or more "1". The VASS signal is inserted behind the VISS signal.

The applicant of the present invention has developed a digital VTR adapted so as to subject input image data to variable length compression, and then record as many variable length coding data as possible on one track irrespective of the number of fields. In such a digital VTR, the number of fields and the number of tracks composing the recorded variable length coding data are not in a linear relationship, so that the tape running distance obtained from the CTL pulses and the number of fields composing the image read out of the video tape are not in a linear relationship. Even if the CTL pulses are counted, therefore, it is impossible to realize a linear time counter function. Further, it is impossible to record on the video tape the control signal such as the VISS signal which is a signal for searching for an arbitrary scene or the VASS signal for recording time required for recording or the like utilizing the CTL signal.

Also in the digital VTR developed by the applicant of the present invention, absolute time information can be recorded in a recording track. When the recording track can be completely traced as at the time of normal reproduction, therefore, the absolute time information need not be acquired utilizing the CTL pulses. When the trace is not completely performed, for example, in cases of FORWARD, REWIND, CUE (FORWARD PLAY), REVIEW (REWIND PLAY), and so forth, the absolute time information cannot be taken out.

Also in the digital VTR developed by the applicant of the present invention, the control signal such as information relating to a search for an arbitrary scene or time information can be recorded in the recording track When the recording track can be completely traced as at the time of normal reproduction, therefore, the information relating to a search for an arbitrary scene, the time information, or the like need not be recorded utilizing the CTL signal. When the trace is not completely performed, for example, in cases of FORWARD, REWIND, CUE (FORWARD PLAY), REVIEW (REWIND PLAY), and so forth, however, the control signal such as the information relating to a search for an arbitrary scene or the time information cannot be taken out.

SUMMARY OF THE INVENTION

An object of the present invention is to provide, even in a digital VTR for subjecting input image data to variable length compression to record variable length coding data on a video tape so that the number of fields and the number of tracks composing the recorded variable length coding data are not in a linear relationship, a digital VTR capable of realizing a linear time counter function.

Another object of the present invention is to provide, even in a digital VTR for subjecting input image data to variable length compression to record variable length coding data on a video tape so that the number of fields and the number of tracks composing the recorded variable length coding data are not in a linear relationship, a digital VTR capable of recording a control signal, composed of a binary signal,such as a VISS signalor a VASS signal on a track other than a recording track.

A first digital VTR according to the present invention is characterized by comprising an image compressing circuit for subjecting input image data to variable length compression, to output variable length coding data and identification data representing the end of one field, recording means for recording on a video tape the variable length coding data outputted from the image compressing circuit, and pseudo CTL signal recording means for recording a pseudo CTL signal on the video tape every time the identification data is outputted from the image compressing circuit.

The pseudo CTL signal is recorded on a voice track, for example, which is not used in the digital VTR.

A second digital VTR according to the present invention is characterized by comprising an image compressing circuit for subjecting input image data to variable length compression, to output variable length coding data and identification data representing the end of one field, means for temporarily storing in a first memory the variable length coding data and the identification data which are outputted from the image compressing circuit, time measurement means for measuring a time interval from the time when the previous identification data is outputted from the image compressing circuit to the time when the current identification data is outputted from the image compressing circuit, means for temporarily storing in a second memory information relating to the time interval obtained by the time measurement means, recording means for reading out the variable length coding data and the identification data from the first memory and recording the variable length coding data on a video tape, and pseudo CTL signal recording means for recording on the video tape a pseudo CTL signal capable of representing a binary value on the basis of information obtained from the second memory every time the identification data is read out of the first memory and relating to a time interval between the identification data read out of the first memory and identification data to be subsequently read out of the first memory.

Physically identical memories can be used as the first memory and the second memory. The pseudo CTL signal is recorded on a voice track, for example, which is not used in the digital VTR. A VISS signal and/or a VASS signal, for example, which have been produced utilizing a CTL signal in an analog VTR, are produced by the pseudo CTl signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a timing chart showing signals in respective units shown in FIG. 3.

DETAILED DESCRIPTION OF THE PREFERRED EMBODIMENTS

[1] Description of First Embodiment

Figure 1:
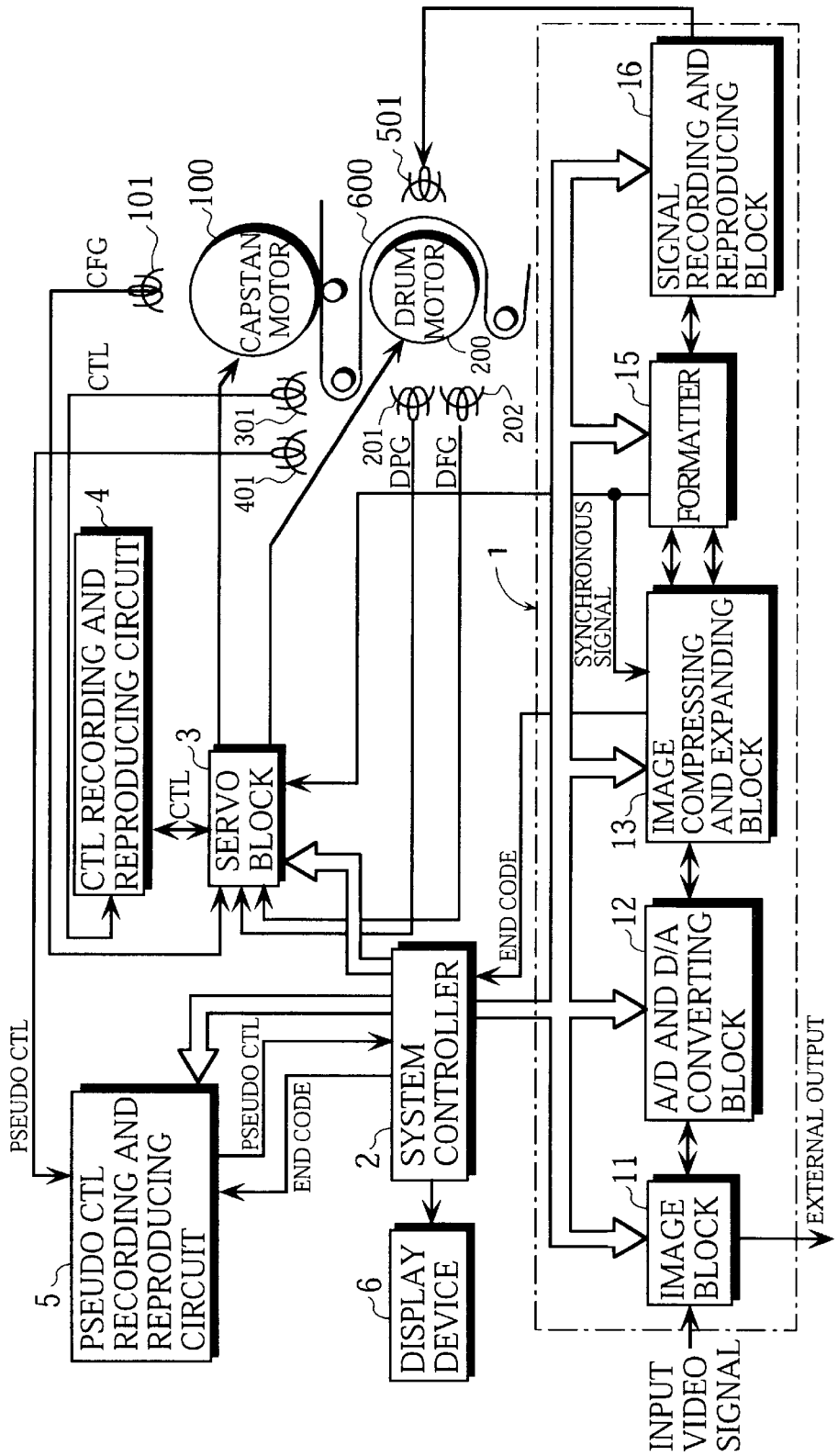
FIG. 1 is a block diagram showing the schematic configuration of a digital VTR.
Figure 2:
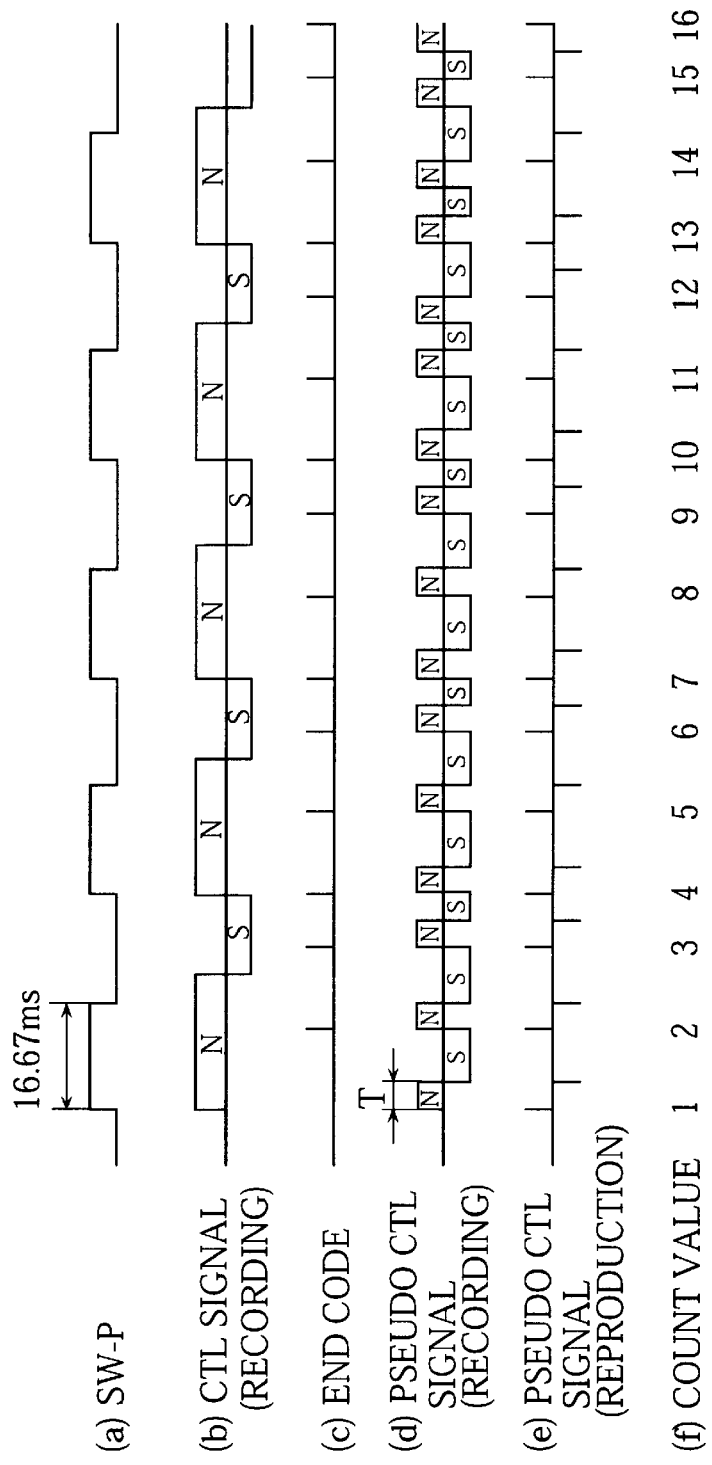
FIG. 2 is a timing chart showing signals in respective units shown in FIG. 1.

Referring now to FIGS. 1 and 2, a first embodiment of the present invention will be described.

FIG. 1 illustrates the configuration of a digital VTR. In FIG. 1, a voice recording and reproducing unit is omitted.

The digital VTR comprises an image recording and reproducing unit 1, a system controller 2, a servo block 3, a CTL recording and reproducing circuit 4, a pseudo CTL recording and reproducing circuit 5, a display device 6, and so forth.

The servo block 3 controls a capstan motor 100 on the basis of an output of a capstan frequency generator (CFG) 101, a CTL signal, and the like, and controls a drum motor 200 on the basis of an output of a drum phase generator (DFG) 201, an output of a drum frequency generator (DFG) 202, and the like, as is well known.

The CTL recording and reproducing circuit 4 records the CTL signal on a control track of a video tape 600 using a CTL head 301 at the time recording, while reading out the CTL signal from the control track of the video tape 600 using the CTL head 301 at the time of reproduction.

The pseudo CTL recording and reproducing circuit 5 records a pseudo CTL signal on a voice track of the video tape 600 using a voice head 401 at the time of recording, while reading out the pseudo CTL signal from the voice track of the video tape 600 using the voice head 401 at the time of reproduction. As the pseudo CTL recording and reproducing circuit 5, a DC bias circuit similar to the CTL recording and reproducing circuit 4 may be used, or an audio circuit may be utilized.

The system controller 2 controls the image recording and reproducing unit 1, the servo block 3, and the pseudo CTL recording and reproducing circuit 5.

The image recording and reproducing circuit 1 comprises an image block 11 for input/output switching, an analog-to-digital (A/D) and digital-to-analog(D/A) converting block 12, an image compressing and expanding block 13 for compressing and expanding an image, a formatter 15, and a signal recording and reproducing block 16 including a recording amplifier and a reproduction amplifier.

At the time of recording, an analog video signal fed to the image block 11 is converted into digital image data by the A/D and D/A converting block 12. The image data obtained by the A/D and D/A converting block 12 is fed to the image compressing and expanding block 13.

As the image compressing and expanding block 13, an image compressing and expanding circuit which is adapted to a JPEG (Joint Photographic Experts Group) system is used in this example. The image compressing and expanding block 13 subjects the fed image data to variable length compression, to generate coding data. The image compressing and expanding block 13 outputs an end code every time it outputs the coding data corresponding to one field.

In the format of D-VHS (Digital-VHS), the amount of information which can be written into one track is 28 kilobytes, and is changed into 12.5 to 25 kilobytes when image data corresponding to one field of normal image quality is subjected to variable length compression at a compression rate of 10 to 20 using JPEG. When the format of D-VHS is employed, therefore, it is possible to record on one track information corresponding to 28/25=1.12 fields to 28/12.5=2.24 fields.

The coding data and the end code which are outputted from the image compressing and expanding block 13 are fed to the formatter 15 in synchronization with a synchronous signal fed from the formatter 15. Further, the end code outputted from the image compressing and expanding block 13 is also fed to the pseudo CTL recording and reproducing circuit 5 through the system controller 2.

The formatter 15 converts the coding data fed from the image compressing and expanding block 13 into data corresponding to the format of D-VHS.

The data obtained by the formatter 15, together with coding data of voice, is recorded on a recording track of the video tape 600 through the recording amplifier in the signal recording and reproducing block 16 and a video head 501. In the digital VTR, the coding data, whose amount corresponds to the capacity of one track, is recorded. Therefore, the respective numbers of fields which are recorded on tracks differ from each other even if the amounts of information which are recorded on the tracks are the same.

On the other hand, the pseudo CTL recording and reproducing circuit 5 first records the N pole on the voice track of the video tape 600 and records the S pole thereon after an elapse of a predetermined time period T using the voice head 401 every time the end code is fed from the system controller 2.

The predetermined time period T is set to the following value. That is, the minimum amount of the variable length coding data obtained by the image compressing and expanding block 13 with respect to the image data corresponding to one field is 12.5 kilobytes, as described above. On the other hand, the amount of information which can be recorded on one track is 28 kilobytes, and time required for recording on one track is 16.67 ms, so that time required for recording per kilobyte is 16.67/28 ms. Consequently, time required for recording with respect to the minimum amount of the variable length coding data corresponding to one field (12.5 kilobytes) is 12.5×(16.67/28)=7.4 ms That is, the minimum value of the time required to record the variable length coding data corresponding to one field is 7.4 ms. Consequently, the S pole may be recordable within 7.4 ms after the N pole is recorded. As a result, the predetermined time period T is set to a time less than 7.4 ms, for example, 4 ms.

FIG. 2 shows how the CTL signal and the pseudo CTL signal are recorded.

The CTL recording and reproducing circuit 4 records a CTL signal as shown in FIG. 2(b) on the control track in synchronization with a switching pulse (SW-P) having a frequency of 30 Hz shown in FIG. 2(a) which is generated from the synchronous signal outputted from the formatter 15. That is, the N pole and the S pole are recorded in a time period from the leading edge of the switching pulse to the subsequent leading edge thereof. Consequently, the period of the CTL signal is equal to a recording period corresponding to two tracks.

On the other hand, the end code is outputted every time the variable length coding data corresponding to one field is outputted from the image compressing and expanding block 13. Therefore, an output interval of the end code varies depending on the contents of an image in each field, as shown in FIG. 2(c). The pseudo CTL recording and reproducing circuit 5 records the pseudo CTL signal on the voice track, as shown in FIG. 2(d), every time the end code is fed. That is, when the end code is outputted, the N pole is first recorded, and the S pole is recorded after an elapse of a predetermined time period T.

At the time of reproduction, data read from the video tape 600 by the video head 501 is converted into the original coding data through the reproduction amplifier in the signal recording and reproducing block 16 and the formatter 15. The coding data obtained by the formatter 15 is expanded after being fed to the image compressing and expanding block 13. The digital image data obtained by the image compressing and expanding block 13 is returned to the analog video signal by the A/D and D/A converting block 12, is then fed to a TV (not shown) through the image block 11, and is displayed thereon.

At the time of reproduction, the pseudo CTL recording and reproducing circuit 5 reads out the pseudo CTL signal, as shown in FIG. 2(e), from the voice track of the video tape 600 through the voice head 401, and feeds the pseudo CTL signal to the system controller 2. In the system controller 2, the leading edges of the pseudo CTL signal fed from the pseudo CTL recording and reproducing circuit 5 are counted, as shown in FIG. 2(f). The count value represents the number of fields composing the variable length coding data read out of the video tape 600. The count value obtained by the system controller 2 is fed to the display device 6, and is displayed thereon.

According to the first embodiment, even in a digital VTR in which input image data is subjected to variable length compression, and variable length coding data obtained is recorded on a video tape so that the number of fields and the number of tracks composing the recorded variable length coding data are not in a linear relationship, it is possible to realize a linear time counter function.

[2] Description of Second Embodiment

Figure 3:
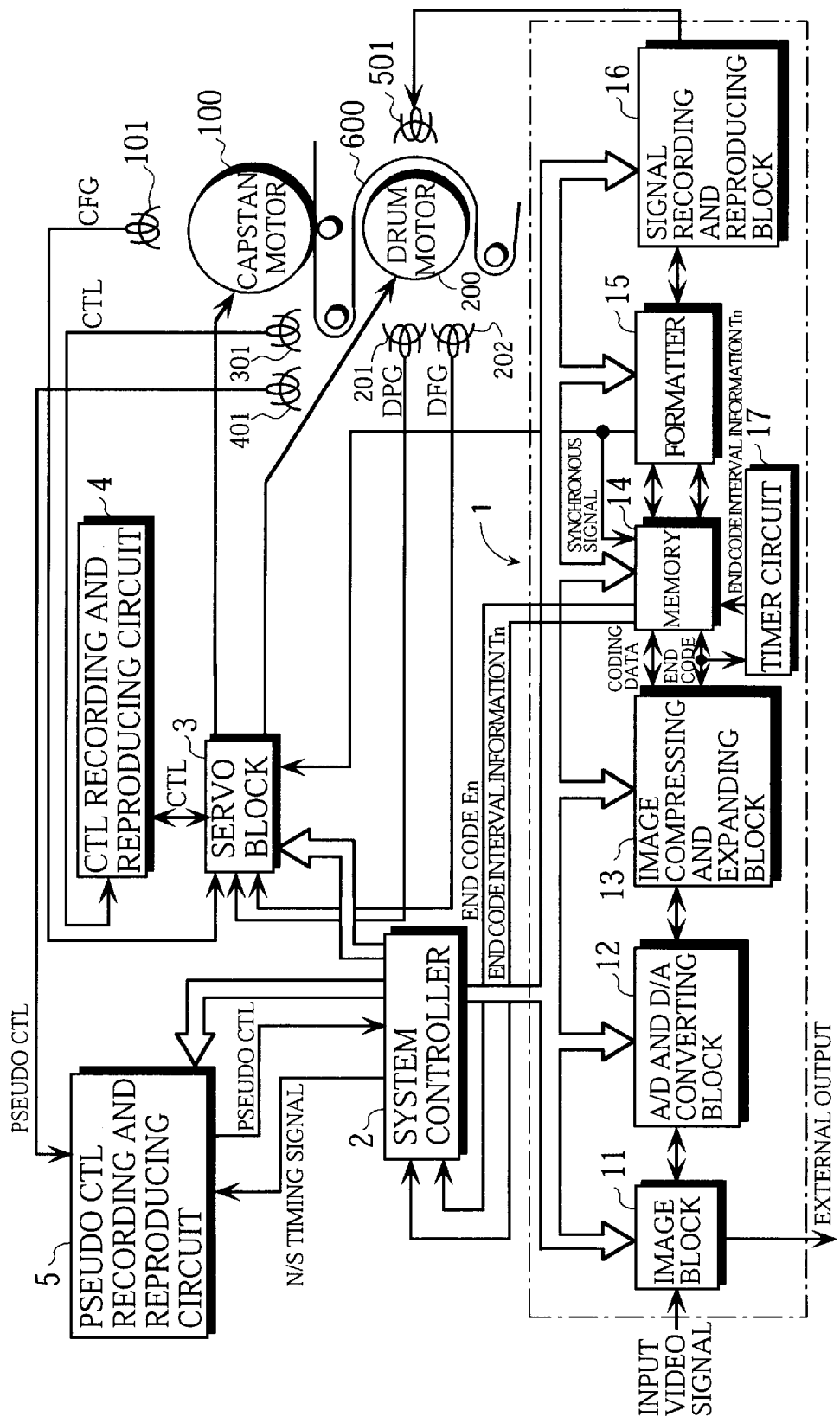
FIG. 3 is a block diagram showing the schematic configuration of a digital VTR.

Referring now to FIGS. 3 and 4, a second embodiment of the present invention will be described.

FIG. 3 illustrates the configuration of a digital VTR. In FIG. 3, a voice recording and reproducing unit is omitted.

The digital VTR comprises an image recording and reproducing unit 1, a system controller 2, a servo block 3, a CTL recording and reproducing circuit 4, a pseudo CTL recording and reproducing circuit 5, and so forth.

The servo block 3 controls a capstan motor 100 on the basis of an output of a capstan frequency generator (CFG) 101, a CTL signal, and the like, and controls a drum motor 200 on the basis of an output of a drum phase generator (DPG) 201, an output of a drum frequency generator (DFG) 202, and the like, as is well known.

The CTL recording and reproducing circuit 4 records the CTL signal on a control track of a video tape 600 using a CTL head 301 at the time recording, while reading out the CTL signal from the control track of the video tape 600 using the CTL head 301 at the time of reproduction.

The pseudo CTL recording and reproducing circuit 5 records a pseudo CTL signal on a voice track of the video tape 600 using a voice head 401 at the time of recording, while reading out the pseudo CTL signal from the voice track of the video tape 600 using the voice head 401 at the time of reproduction. As the pseudo CTL recording and reproducing circuit 5, a DC bias circuit similar to the CTL recording and reproducing circuit 4 may be used, or an audio circuit may be utilized.

The system controller 2 controls the image recording and reproducing unit 1, the servo block 3, and the pseudo CTL recording and reproducing circuit 5

The image recording and reproducing circuit 1 comprises an image block 11 for input/output switching, an A/D and D/A converting block 12, an image compressing and expanding block 13 for compressing and expanding an image, a memory 14, a formatter 15, a signal recording and reproducing block 16 including a recording amplifier and a reproduction amplifier, and a timer circuit 17.

At the time of recording, an analog video signal fed to the image block 11 is converted into digital image data by the A/D and D/A converting block 12. The image data obtained by the A/D and D/A converting block 12 is fed to the image compressing and expanding block 13.

As the image compressing and expanding block 13, an image compressing and expanding circuit which is adapted to a JPEG system is used in this example. The image compressing and expanding block 13 subjects the fed image data to variable length compression, to generate coding data. The image compressing and expanding block 13 outputs an end code every time it outputs the coding data corresponding to one field.

In the format of D-VHS, the amount of information which can be written into one track is 28 kilobytes, and is changed into 12.5 to 25 kilobytes when image data corresponding to one field of normal image quality is subjected to variable length compression at a compression rate of 10 to 20 using JPEG. When the format of D-VHS is employed, therefore, it is possible to record on one track information corresponding to 28/25=1.12 fields to 28/12.5=2.24 fields.

The coding data and the end code which are outputted from the image compressing and expanding block 13 are temporarily stored in the memory 14. The end code outputted from the image compressing and expanding block 13 is also fed to the timer circuit 17. The timer circuit 17 measures information relating to a time interval from the time when the end code is fed to the timer circuit 17 to the time when the subsequent end code is fed to the timer circuit 17 (hereinafter referred to as end code interval information Tn), and feeds the obtained end code interval information Tn to the memory 14.

The coding data and the end code which are fed from the image compressing and expanding block 13 and the end code interval information Tn fed from the timer circuit 17 are stored in the memory 14.

The coding data, the end code, the end code interval information Tn which are stored in the memory 14 are read out in synchronization with a synchronous signal fed from the formatter 15. Before a certain end code En is read out of the memory 14, however, end code interval information Tn, representing a time interval between the timing at which the end code En is read out and the timing at which an end code E(n+1) to be subsequently read out of the memory 14 is read out, is read out.

The coding data and the end code En which are read out of the memory 14 are fed to the formatter 15. Further, the end code En and the end code interval information Tn which are read out of the memory 14 are also fed to the system controller 2.

The formatter 15 converts the coding data fed from the memory 14 into data corresponding to the format of D-VHS.

The data obtained by the formatter 15, together with coding data of voice, is recorded on a recording track of the video tape 600 through the recording amplifier in the signal recording and reproducing block 16 and a video head 501. In the digital VTR, the coding data, whose amount corresponds to the capacity of one track, is recorded. Therefore, the respective numbers of fields recorded on tracks differ from each other even if the amounts of information which are recorded on the tracks are the same.

On the other hand, the system controller 2 calculates, when the end code En is fed from the memory 14, the ratio of time required to write the N pole to time required to write the S pole depending on a binary value ("0" or "1") representing a control signal such as a VISS signal or a VASS signal on the basis of the end code interval information Tn representing a time interval between the timing at which the end code En is read out and the timing at which the end code E(n+1) to be subsequently read out of the memory 13 is read out, to feed a timing signal (an N/S timing signal) representing the timing at which the N pole is written and the timing at which the S pole is written to the pseudo CTL recording and reproducing circuit 5.

The pseudo CTL recording and reproducing circuit 5 records, when the N/S timing signal is fed, a pseudo CTL signal on the voice track of the video tape 600 using the voice head 401 on the basis of the N/S timing signal.

FIG. 4 shows how the CTL signal and the pseudo CTL signal are recorded.

The CTL recording and reproducing circuit 4 records a CTL signal as shown in FIG. 4(b) on the control track in synchronization with a switching pulse (SW-P) having a frequency of 30 Hz as shown in FIG. 4(a) which is generated from the synchronous signal outputted from the formatter 15. That is, the N pole and the S pole are recorded in a time period from the leading edge of the switching pulse to the subsequent leading edge thereof. Consequently, the period of the CTL signal is equal to a recording period corresponding to two tracks.

On the other hand, the end code En is outputted every time the variable length coding data corresponding to one field is outputted from the image compressing and expanding block 13. Therefore, an output interval Tn of the end code En varies depending on the contents of an image in each field, as shown in FIG. 4(c). The end code En outputted from the image compressing and expanding block 13 is temporarily stored in the memory 14, is then read out with time delay, as shown in FIG. 4(d), and is fed to the system controller 2.

As described in the foregoing, before a certain end code En is read out of the memory 14, end code interval information Tn representing a time interval between the timing at which the end code En is read out and the timing at which an end code E(n+1) to be subsequently read out of the memory 14 is read out is read out, and is fed to the system controller 2.

Before an end code E1 shown in FIG. 4(d), for example, is read out of the memory 14, therefore, end code interval information T1 representing a time interval between the timing at which the end code E1 is read out and the timing at which an end code E2 is read out is read out of the memory 14, and is fed to the system controller 2.

The system controller 2 calculates, when the end code En is fed, the ratio of time required to write the N pole to time required to write the S pole on the basis of the end code interval information Tn representing the time interval between the timing at which the end code En is read out and the timing at which the subsequent end code E(n+1) is read out (which is fed before the end code En is fed), to feed the N/S timing signal to the pseudo CTL recording and reproducing circuit 5.

When an attempt to record the pseudo CTL signal taking a value "0" is made, for example, the system controller 2 calculates the timing at which the N pole is written and the timing at which the S pole is written such that the ratio of a time period TN during which the N pole is written to a time period TS during which the S pole is written will be 60:40, and feeds the timings to the pseudo CTL recording and reproducing circuit 5. In this case, the pseudo CTL recording and reproducing circuit 5 controls the voice head 401, to record the N pole in the time period TN during which the N pole is written, while recording the S pole in the time period TS during which the S pole is written on the voice track of the video tape 600, as shown in FIG. 4(e).

When an attempt to record the pseudo CTL signal taking a value "1" is made, the system controller 2 calculates the timing at which the N pole is written and the timing at which the S pole is written such that the ratio of the time period TN during which the N pole is written to the time period TS during which the S pole is written will be 27.5:72.5, and feeds the timings to the pseudo CTL recording and reproducing circuit 5.

At the time of reproduction, data read from the video tape 600 by the video head 501 is converted into the original coding data through the reproduction amplifier in the signal recording and reproducing block 16 and the formatter 15. The coding data obtained by the formatter 15 is expanded after being fed to the image compressing and expanding block 13 through the memory 14. The digital image data obtained by the image compressing and expanding block 13 is returned to the analog video signal by the A/D and D/A converting block 12, is then fed to a TV (not shown) through the image block 11, and is displayed thereon.

At the time of reproduction, the pseudo CTL recording and reproducing circuit 5 reads out the pseudo CTL signal, as shown in FIG. 4(f), from the voice track of the video tape 600 through the voice head 401, and feeds the pseudo CTL signal to the system controller 2. In the system controller 2, the pseudo CTL signal fed from the pseudo CTL recording and reproducing circuit 5 is converted into a string of codes taking a value "0" or "1" as shown in FIG. 4(g) on the basis of the ratio of TN to TS, to distinguish the VISS signal and the VASS signal.

According to the second embodiment, even in a digital VTR in which input image data is subjected to variable length compression, and variable length coding data obtained is recorded on a video tape so that the number of fields and the number of tracks composing the recorded variable length coding data are not in a linear relationship, a control signal, composed of a binary signal, such as a VISS signal or a VASS signal can be recorded on a track other than a recording track.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital VTR comprising:

an image compressing circuit for subjecting input image data to variable length compression, to output identification data representing the end of one field every time variable length coding data corresponding to one field is outputted;

recording means for recording on a video tape the variable length coding data outputted from the image compressing circuit; and pseudo control signal recording means for recording a pseudo control signal on a voice track of the video tape every time the identification data is outputted from the image compressing circuit.

2. The digital VTR according to claim 1, wherein the pseudo control signal is recorded on a voice track which is not used in the digital VTR.

3. A digital VTR comprising:

an image compressing circuit for subjecting input image data to variable length compression, to output variable length coding data and identification data representing the end of one field;

means for temporarily storing in a first memory the variable length coding data and the identification data which are outputted from the image compressing circuit;

time measurement means for measuring a time interval from the time when the previous identification data is outputted from the image compressing circuit to the time when the current identification data is outputted from the image compressing circuit;

means for temporarily storing in a second memory information relating to the time interval obtained by the time measurement means;

recording means for reading out the variable length coding data from the identification data from the first memory and recording the variable length coding data on a video tape; and pseudo control signal recording means for recording on the video tape a pseudo control signal capable of representing a binary value on the basis of information obtained from the second memory every time the identification data is read out of the first memory and relating to a time interval between the identification data to be subsequently read out of the first memory.

4. The digital VTR according to claim 3, wherein the first memory and the second memory are physically identical memories.

5. The digital VTR according to claim 3, wherein the pseudo control signal is recorded on a voice track which is not used in the digital VTR.

6. The digital VTR according to claim 3, wherein a VISS signal and/or a VASS signal which have been produced utilizing a control signal in an analog VTR are produced by the pseudo control signal.

* * * * *